March 2, 1937. A. A. KNEE 2,072,504
CHECK TESTING APPARATUS
Original Filed Jan. 18, 1932 5 Sheets-Sheet 1

Fig.1

Inventor:
A. A. KNEE

By Paul B Eaton
Attorney

March 2, 1937. A. A. KNEE 2,072,504
CHECK TESTING APPARATUS
Original Filed Jan. 18, 1932 5 Sheets-Sheet 4

Inventor:
A. A. Knee
By James B. Eaton
Attorney

March 2, 1937.  A. A. KNEE  2,072,504

CHECK TESTING APPARATUS

Original Filed Jan. 18, 1932   5 Sheets-Sheet 5

Inventor
A. A. KNEE
By Paul S. Eaton
Attorney

Patented Mar. 2, 1937

2,072,504

UNITED STATES PATENT OFFICE 2,072,504

CHECK TESTING APPARATUS

Aaron A. Knee, Charlotte, N. C., assignor to Vanak Corporation, Charlotte, N. C., a corporation of North Carolina Application January 18, 1932, Serial No. 587,365
Renewed November 6, 1934

26 Claims.  (Cl. 194—97)

This invention relates to a fraud preventive device for check controlled apparatus and more especially to a device having pressure responsive members operable by a check having certain characteristics of facial configuration.

Another object of my invention is to provide a check testing apparatus having a plurality of feelers adapted to feel the surface configuration of a presented check with means whereby the check is rejected unless at least one of the feelers remains unaffected by said presented check.

Another object of this invention is to provide a check testing apparatus in which means are provided for testing the facial configuration of a presented check together with a deflector controlled by said facial configuration testing means for determining the course of the check after it passes out of the check testing apparatus.

Another object of this invention is to provide a check testing apparatus having means for testing the facial configuration of a check together with means for adjusting the degree of accuracy of the testing operation.

Another object of my invention is to provide a check testing apparatus for simultaneously testing the facial configuration of the check, also the diameter of the check and the thickness of the check and having means for disposing of the check governed independently by each of the three testing means.

Some of the objects of the invention having been stated, other objects will appear as the description proceeds when taken in connection with the accompanying drawings, in which—

Referring more specifically to the drawings, the numeral 10 indicates any check controlled apparatus which is usually provided with an opening 11 thru which rejected checks or coins are returned to the exterior of the machine, said machine having therein any suitable means for operation of the check testing apparatus and one form of means for operating is shown in which a lever 13 is pivotally mounted as at 14 to a link 15 which link is secured as at 16 to a downwardly projecting connecting rod 17 for operation of the device. The operating lever 13 projects to the exterior of the machine thru opening 18. Connecting rod 17 is slidably supported by guide 19 secured to sidewall 34.

The check testing apparatus is adapted to be secured on top of the machine with which it is associated by welding or any other suitable means and comprises a casing 20 which is U-shaped in cross section comprising the sidewalls 21 and 22 and the front portion 23. A member 24 which is U-shaped in vertical section is adapted to fit into member 20 to form a complete casing for the mechanism, said member 24 comprising the vertical portion 25 and top portion 26 and bottom portion 27.

The portion 27 has an upturned portion 27a formed from a part of the portion which is cut away to make opening 27b in the portion 27 and this portion 27a serves as a wall against which the coins might be deflected by the deflector when they are accepted, and aids in guiding them thru the rear of opening 27b thru opening 202 into the check controlled apparatus.

Transversely disposed pins 28 and 29 are mounted in the sidewalls 21 and 22, and top portion 26 and bottom portion 27 have inwardly projecting portions 30 and 31 to hook over pins 28 and 29 to hold the member 24 in position.

Figure 1:
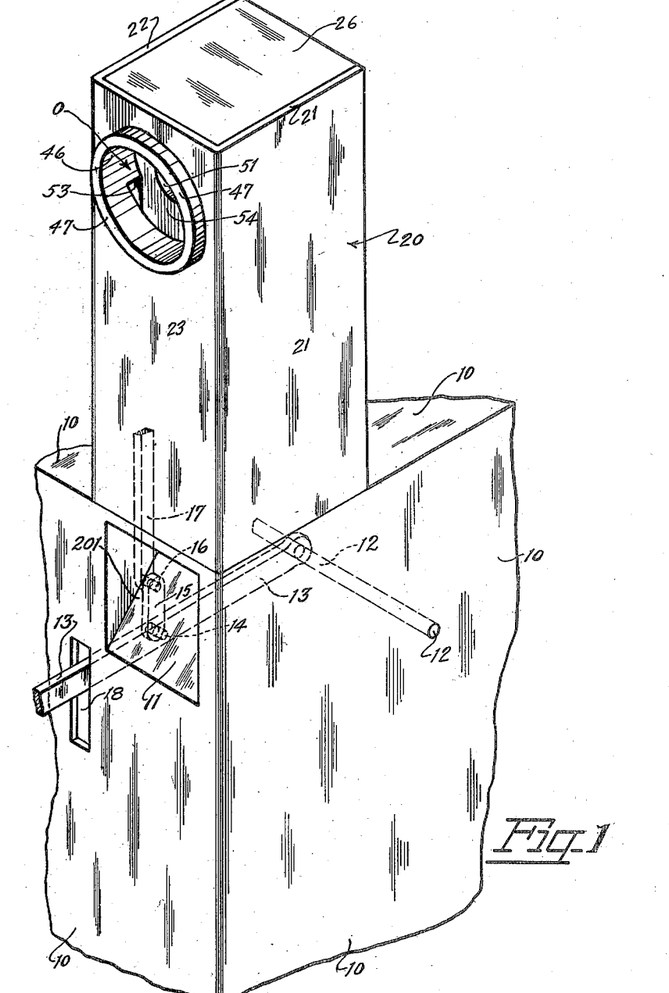
Figure 1 is a perspective view of the check testing apparatus shown in combination with a portion of a check controlled machine.
Figures 2, 3:
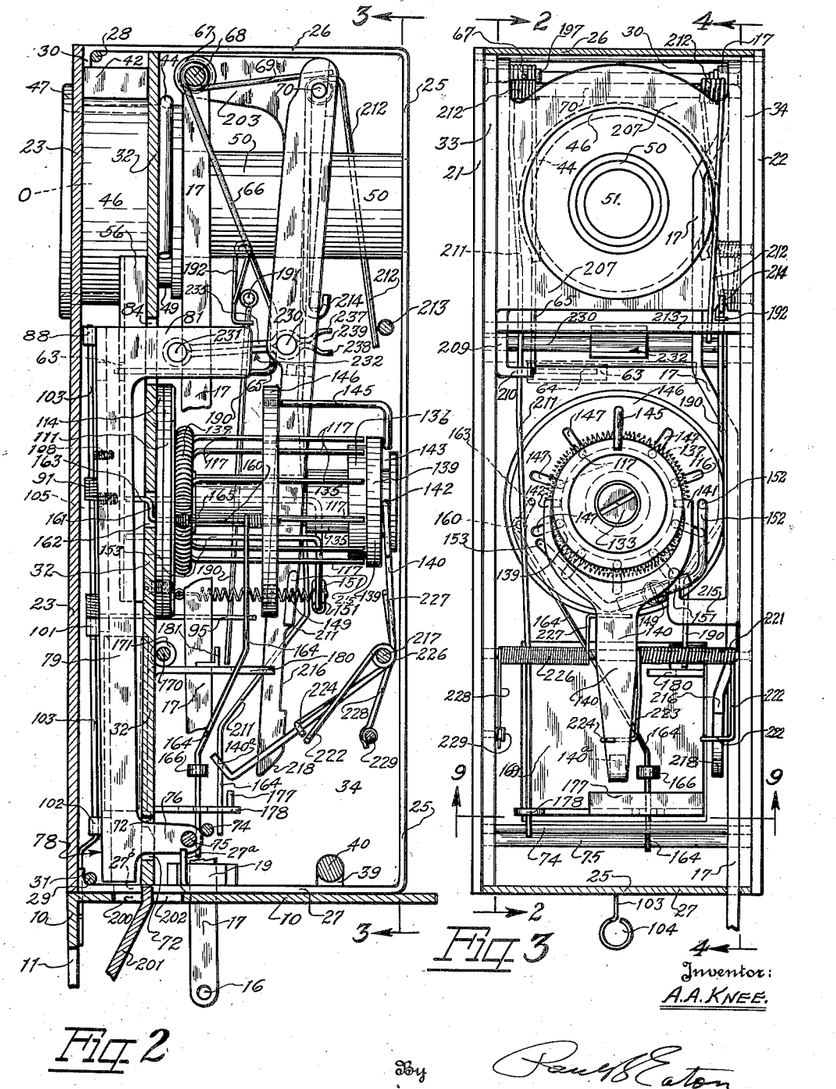
Figure 2 is a side elevation with the nearest side removed; and taken along the line 2—2 in Figure 3.
Figure 3 is a rear view of the device looking from along the line 3—3 in Figure 2.

Adapted to fit within housing 20 is another housing U-shaped in cross section, comprising a front portion 32 and sidewall portions 33 and 34. These sidewall portions of the housing comprising the portions 32, 33 and 34 are not quite as large as the housing 20, leaving a space 35 at the top and 36 at the bottom and 37 at the back (see Figure 4) into which the cover 24 with its parts 25, 26, and 27 is adapted to fit, as shown in Figures 1 and 2.

The sidewall portions 33 and 34 have notches 38 and 39 cut in the lower edge thereof which are adapted to fit over a transversely disposed pin 40 which is mounted in the sidewalls 21 and 22 of the outer housing 20. Pin 40 regulates the downward movement of the inner housing, and the forward movement of the inner housing at the top is regulated by abutments 41 and 42 secured on the inside surfaces of sidewalls 21 and 22 of the outer housing 20.

The portion 23 of outer housing 20 and the portion 32 of inner housing have holes therein in which the check entrance member 45 is mounted. This member comprises a cylindrical portion 46 made preferably of a size to admit a check or coin of a definite size and has a flange 47 which overlaps the exterior surface of portion 23 and a slightly restricted portion 48 penetrates a hole in member 32 and immediately behind portion 32 is a circumferential groove 49 in which is mounted a locking member 44 which member 44 is approximately U-shaped and is adapted to clamp in groove 49 to lock member 45 in position, which locks the inner housing in the outer housing.

Member 45 has an extended cylindrical portion 50 which has a hollow portion 51. Member 50 extends rearwardly thru the device and seats in the back cover portion 25 as at 52. Member 45 has a semi-circular slot 53 in the lower side thereof thru which the check or coin is adapted to fall after being inserted thru opening O against the rear wall 54 of said opening.

Wall 54 coincides with the rear wall of a channel 55 formed of portion 32 and a flattened U-shaped member 56 which is held on portion 32 by means of inwardly projecting pins 57 and 58, fitting in slots 59 and 60 in the lower portion of member 56.

Figure 5:
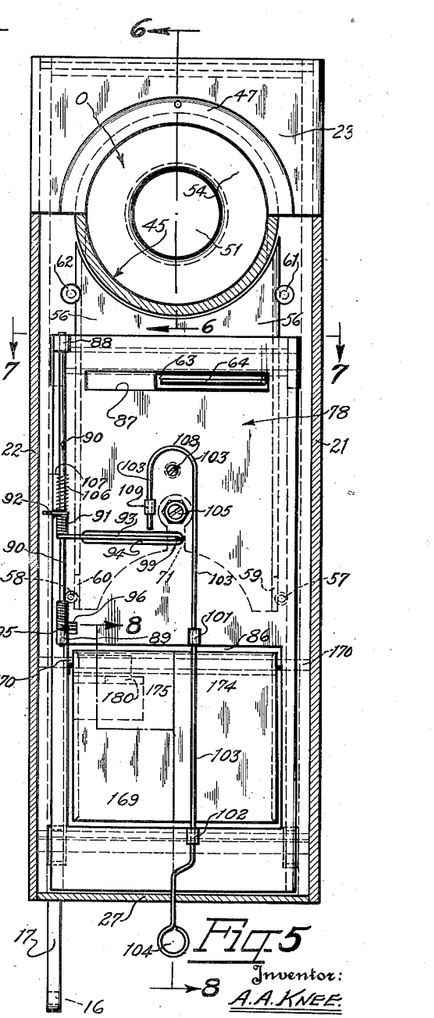
Figure 5 is a view partially in section taken along the line 5—5 in Figure 4 with a portion of the front cover omitted.

The top portion of member 56 is held in position by means of pins 61 and 62 which are turned inwardly at their outer ends. Member 56 has a transversely disposed slot 63 therein in which a check gripper 64 is adapted to have movement, said check gripper 64 having a lateral portion, as shown in Figure 5, and it is then bent at approximately right angles and projects thru a suitable hole 43 in portion 32, the portion extending thru portion 32 being designated by reference character 65.

The check gripper also has integral therewith an upwardly extending portion 66 (see Fig. 2) which ends in the form of a torsion spring 67 wound around pin 68 secured in sidewall 34 and said spring has a leg portion 69 resting on top of pin 70 which extends between sidewall portions 33 and 34.

The normal tendency of portions 64, 65, and 66 is to move to the right in Figure 2 to grip the coin, but when the parts are in the position shown in Figure 2 the portions 64, 65, and 66 are pressed forwardly to the left in Figure 2 by pin 230 to cause the portion 64 to occupy slot 63 and to be moved out of the path of the falling check.

In the lower portion of member 56 a slot 71 occurs thru which hole detector 93 and adjustable screw 105 project, as will be later described.

Transversely disposed in the lower part of the inner housing and mounted in sidewalls 33 and 34 is a pin 75 on which is pivotally mounted lugs 76 and 77 of member 78, member 78 being disposed on the outer side of portion 32 of the inner housing and the lugs 76 and 77 project thru holes 72 and 73 in portion 32.

Member 78 has inturned flanges 79 and 80 along its edges and at the upper end has inwardly projecting lugs 81 and 82 which carry additional parts for operation of the device which will be presently described. The lugs 81 and 82 project thru holes 83 and 84 in portion 32.

In the lower portion of member 78 a window 86 is provided to render the deflector mechanism accessible which deflector will be later described. Near the upper end of member 78 is a transversely disposed elongated slot 87 which is also provided for permitting member 64 to operate therein, said member 64 and associated parts having already been described as being the means for gripping a check and holding it in position if the same is inserted into the device while a coin is already being tested for surface configuration.

Figure 7:
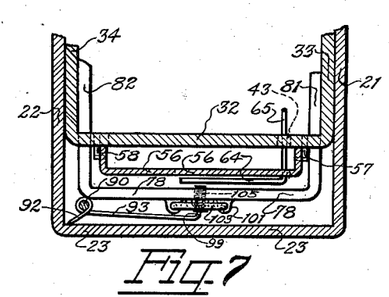
Figure 7 is a transverse sectional view taken along the line 7—7 in Figure 5 showing the front portion only of the device.
Figure 8:
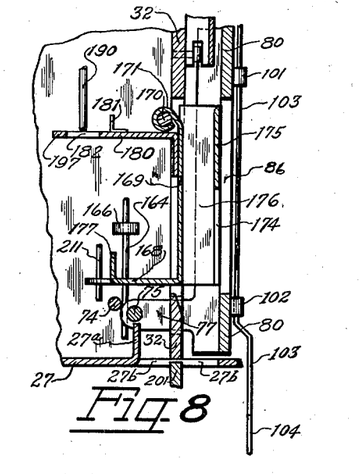
Figure 8 is a vertical sectional view taken along the line 8—8 in Figure 5.
Figure 9:
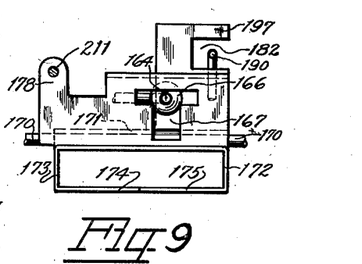
Figure 9 is a transverse cross sectional view looking upward from along the line 9—9 in Figure 3.

Member 78 has lugs 88 and 89 thereon in which is pivotally mounted a vertically disposed shaft 90, said shaft having fixedly secured thereon a bell crank 91 which has an arm 92 projecting outwardly, the arm 92 projecting against the portion 23 of the exterior casing (see Fig. 7) when the parts are in normal position.

Shaft 90 has mounted therearound a torsion spring 106 which has one end hooking under arm 92 and the other end 107 rests against the surface of member 78, the purpose of the spring being to normally force arm 92 outwardly against the inner surface of the portion 23 of the outer casing and to force arm 93 and associated parts inwardly.

Associated with bell crank 91 is an arm 93 which has movement in a slot 94 in member 78 and portion 93 projects inwardly as at 99 to determine if a check has a hole in it. Portion 99 engages a solid check slightly below the center of the check. The position of portion 99 may be determined in each machine to suit circumstances as its purpose is to reject when not locked out of position, all checks having a hole of a given size therein. Near the lower end of shaft 90 is secured an arm 95 which projects thru a hole 96 in portion 78 and also projects thru a hole 97 in portion 32 and projects inside of the interior casing composed of portions 32, 33, and 34 and has a hook 98 on the end thereof the purpose of which is to engage arm 190 when a check having a hole of at least a given size therein is placed in the device because a check with a hole of at least a given size therein will not engage portion 99 to hold hook 98 out of the path of pivoted member 190. Therefore, checks of a given diameter and which pass the facial testing means will always be accepted for portion 99 and associated parts when not locked in neutral position by member 103 destroys the effect of thickness measuring means of screw 105 and pin 196 for pin 196 cannot swing arm 190 because it is held by hook 98 when the perforation detector 99 is working.

Mounted on the exterior of member 78 are the projections 100, 101, and 102 serving as frictional bearings for a member 103 which extends below the testing device and has a loop 104 therein so that the device can be manipulated from the exterior of the check testing apparatus. The purpose of member 103 is to throw member 93 and associated parts to neutral position. This throwing into neutral position is effected by pulling member 103 downwardly between arm 93 and member 78 when arm 93 is in normal position and occupying a position between the plane occupied by member 78 and the front wall 23 of the exterior casing.

When locked in neutral position hook 98 will at all times be held out of path of pivoted arm 190 and checks with a central perforation or depression will be rejected for pin 196 will swing arm 190 beyond notch 182 in deflector 169.

A set screw 105 is adjustably mounted in member 78 and projects a slight distance inwardly on the inside portion of member 78 and is adapted to pass thru slot 71 in member 56 when 78 is moved inwardly on its pivot 75 to engage the central portion of the check.

By adjusting the position of set screw 105 the apparatus can be set to impart a test to checks of a definite thickness and if of proper surface configuration and of proper diameter, the checks will be accepted. In other words, with a definite setting of set screw 105 for a check of a prescribed thickness, if the facial configuration of the check and its diameter are also proper the check will be accepted, because the adjustment of 105 is such as to cause pivoted arm 190 to be moved by pin 196 just far enough to register with notch 182 (see Fig. 10).

Member 78 has also therein an adjustable screw 108 which is normally adjusted to project toward the check a slightly less amount than screw 105. This screw 108 is slightly farther removed from the screw 105 than point 99 of perforation detector 93. The purpose of screw 108 is to apply pressure to a perforated check for screw 105 in the case of a perforated check cannot exert any pressure on the check to present the other side of the check to the points 118 to test its facial configuration. In case a non-perforated check is used then screw 108 performs no function as screw 105 prevents it from engaging the check.

The purpose of perforation detector 94 and associated parts is to enable the device to accept checks of a particular type having a hole of a given size in the center. It is evident that detector 94 can be placed any desired distance from the screw 105 to accept any check whose perforation is not too small. Member 56 has a hole 109 therein thru which screw 108 passes to engage the check when screw 105 coincides with a perforation in a check.

Figure 12:
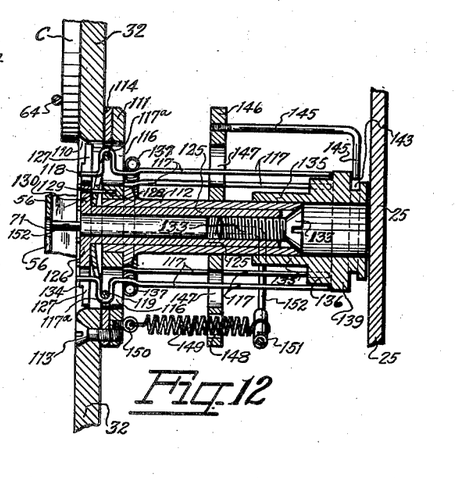
Figure 12 is a longitudinal and vertical sectional view taken thru the facial configuration testing means.

By referring to Figure 12 it is seen that member 32 has a hole 110 therein thru which projects a portion of the facial configuration testing means. This facial configuration testing means comprises a disk 111 which is countersunk on a tubular member 112. The member 111 is secured to member 32 by means of a plurality of screws 113 which also penetrate spacer 114. Disk 111 has a plurality of radial slots 116 therein in which bell crank levers 117 have movement, and these bell crank levers have a U-shaped portion 117a and also have points 118 which feel the facial configuration of the check. The U-shaped portions 117a are mounted on a ring 119 disposed in a groove 120 integral with disk 111.

Figure 11:
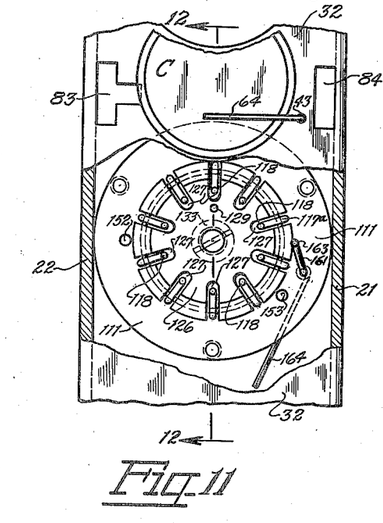
Figure 11 is a front elevation of the facial configuration reading means and associated parts, with a portion of the mechanism in front of the facial configuration testing means being broken away.

Slidably mounted within tubular portion 112 is another tubular portion 125 which has integral therewith on the left hand end as shown in Figure 12 a disk 126 which is shown in Figures 11 and 12, said disk 126 having a plurality of radial slots 127 therein whose outer ends are open and the ends 118 of bell crank levers 117 project thru the slots a substantial distance beyond the outer plane of disk 126 so that these ends 118 will engage the surface of a check to test the facial configuration thereof. Disk 111 has fixedly secured therein a pin 128 which slidably projects into a hole 129 in disk 126 to prevent relative rotative movement between disk 111 and disk 126.

Figure 15:
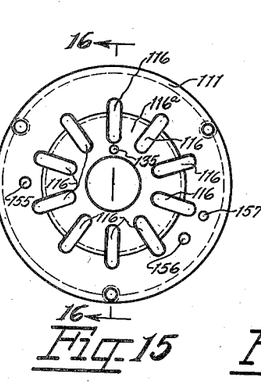
Figure 15 is a front elevation of disk 111 in which the facial testing bell cranks are pivotally mounted.
Figure 16:
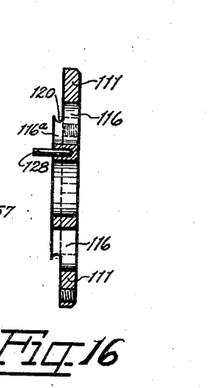
Figure 16 is a cross sectional view taken along the line 16—16 in Figure 15.
Figure 17:
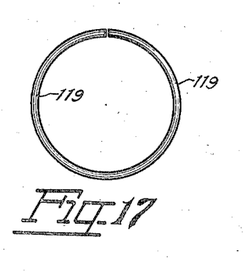
Figure 17 is a view of the ring 119 on which the bell crank members 117 are pivotally mounted.

Disk 111 has integral therewith a projecting portion 116a which is circular and centrally disposed as shown in Figures 15 and 16.

Figures 13, 14:
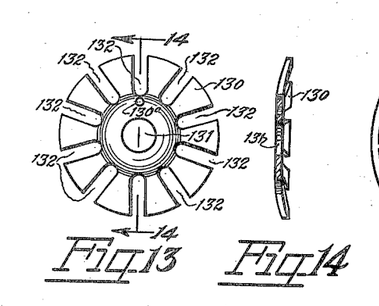
Figure 13 is an elevation of spring washer 130.
Figure 14 is a cross sectional view taken along the line 14—14 in Figure 13.

Disposed between raised portion 116a of disk 111 and disk 126 is a spring washer 130 as shown more particularly in Figures 13 and 14. This spring washer has a central opening 131 thru which tubular portion 125 of disk 126 passes and this washer also has a plurality of radial slots 132 thru which the portions 118 of bell crank levers 117 project and also in which a portion of the U-shaped portions 117a of member 117 have movement. The purpose of this spring washer is to normally move the disks 111 and 126 apart from each other against the pull of set screw 133 which is threadably secured on the interior of tubular member 125 and has its head resting against the end of tubular member 112 so that by adjusting screw 133 the distance the points 118 of bell crank levers 117 project from the surface of disk 126 may be regulated.

Disk 126 has a central raised circular portion 134 against which the side of the check or coin is adapted to rest during the facial testing operation. Pin 128 also projects thru a hole 130a in spring washer 130. The raised portion 134 is circular and of slightly less dimension than the prescribed check as most slugs have a rim portion which is thicker than the facial portions of the slug, and in the case of checks which are non-genuine and which are sometimes used to defraud check controlled apparatus, these checks also have a rim on the edge thereof which is thicker than any other portion of the check and by providing this raised circular portion it renders the device more effective for the elimination and rejecting of non-genuine checks or coins.

By means of the raised portion 134 allowing the rim of the check to fit outside of this raised portion to allow the central portion of the check to be pressed against this raised portion 134, this permits the thickness of the check to be taken by set screw 105 and, therefore, eliminates the necessity of having thickness measuring means on both sides of the check.

By means of screw 133 the distance which points 118 project from surface 134 is regulated and, likewise, the amount of movement imparted to the other ends of bell cranks 117 is regulated, so if desired the adjustment may be varied from slight movement of bell cranks 117 to a point where even a new coin with uneven facial configuration may move on the bell cranks to reject a genuine coin. It is thus seen that the device may be adjusted so a worn coin with slight facial unevenness may be accepted if desired.

Slidably mounted on the exterior of tubular portion 112 is another tubular portion 135 which has an enlarged or flange portion 136 on which the ends of bell crank levers 117 are adapted to rest on account of being normally pulled inward by means of endless tension spring 137 which encircles all of the bell crank levers 117 immediately adjacent disk 111.

Member 135 also has a portion 139 against which the ends of bell crank levers 117 are adapted to strike when they are not moved out of the path of flange 139 by the facial configuration of the inserted checks, as member 135 and its associated parts are slidably mounted on tubular member 112 and are adapted to be slid on this member by means of a forked arm 140 engaging the same and moving it toward disk 111 as will be presently described as forked arm 140 is turned inwardly at each end of the fork as at 141 and 142 and engages a circumferential groove 143 in member 136.

Adapted to fit within groove 143 is an L-shaped pin 145 which has its other end secured in a disk 146. This disk 146 is fixedly secured on tubular portion 112 and has a plurality of radially disposed slots 147 therein, similar to slots 116 in member 111, there being a slot for each of the bell crank levers 117 and in these slots bell crank levers 117 have movement without engaging the sidewalls of the slots. Disk 146 also has therein a hole 148 thru which a tension spring 149 passes, one end of the tension spring being secured to disk 111 as at 150 and the other end being secured to a tubular member 151 in which tubular member the ends of irregularly shaped check supports 152 and 153 are inserted so as to allow these members 152 and 153 to have slight independent action of each other to cause each support to seek alignment in its mounting, said members 152 and 153 slidably penetrating suitable holes in disk 146 and also penetrating in a slidable manner holes 155 and 156 in disk 111 (see Fig. 11) and also slidably penetrating washer 114 and outside of spring washer 130 and also outside of disk 126 and press against the inside surface of member 56 (see Fig. 12) being normally urged against member 56 by tension spring 149 previously described.

Turnably mounted in disks 111 and 146 is a shaft 160 which penetrates hole 157 in plate 111 and also has crank 161 on its outer end working in a slot 162 in portion 32 and the end 163 of this member projects in close proximity to the interior surface of member 56 and is so arranged as to be in the path of a check as it falls in front of the configuration reading means. When the check is resting on supporting pins 152 and 153 the periphery of the check will be engaged by the portion 163 of shaft 160 and the degree of turning movement imparted to shaft 160 will determine the amount of movement imparted to an arm 154 fixedly secured on member 160 in close proximity to disk 146. Also near disk 111 is secured a collar 165 which prevents sliding movement of shaft 160 in disks 111 and 146 but permits turning movement. If desired, a weight 166 may be secured on arm 164 to hold part 163 against the edge of the check.

Arm 164 projects thru a T-shaped slot 167 in portion 168 of a deflector mechanism 169. The deflector 169 is pivotally mounted by means of a pin 170 mounted in sidewalls 33 and 34 passing thru the curled portion 171. Deflector 169 has end portions 172 and 173 which are turned inwardly toward each other with portions 174 and 175 forming a chute 176 for disposition of the check after it has passed the facial configuration testing means. Deflector portion 168 has an upturned ledge 177 on the outer end thereof and also has a projecting portion 178 with a hole 179 therein. Deflector 169 also has projecting therefrom a portion 180 which has an upwardly projecting portion 181 secured to the upper side thereof and also has a notch 182 in one side thereof.

The lower end of arm 164 is prevented from front and rearward movement by means of pin 75 which has been described, and a pin 74 which is, likewise, secured between sidewalls 33 and 34 and this allows lateral movement of arm 164 but prevents backward and forward movement of said arm so that when the arm is in either the right hand or left hand side of notch 167 (see Fig. 10) of the deflector 169, the pin 74 will prevent the arm from being moved forwardly or rearwardly by the deflector when the shoulders of the restricted portions on each side of the notch 167 engage the arm 164, and thus arm 164 will act as a stop to prevent movement of the deflector.

One of the means which are provided for preventing the deflector 169 from swinging on its pivot 170 comprises mechanism for testing the check for thickness. These means comprise a swinging arm 190 pivotally mounted on pin 191 secured in sidewall 34 which is normally pressed to the right in Figure 4, or toward the front of the device, by a torsion spring 192 having one end hooked over the arm 190, said torsion spring being mounted on a pin 193 with the other leg of the torsion spring being in engagement with the pin 191.

Immediately below the point at which the hook engages arm 190, the arm, at times, is adapted to be engaged by a pin 196 mounted in lug 82 on member 78 so that when member 78 is moved inwardly to press the checks against the facial configuration testing members which are the bell crank levers 117, the pin 196 will swing the lower end of arm 190 toward the rear of the device, and if the check is of proper thickness it will allow the deflector to be swung on its pivot because the lower end of arm 190 will pass into notch 182, whereas, if the check is too thick the lower end of arm 190 will rest on portion 195 of member 180.

If the check is thinner than the prescribed thickness it will cause the lower end of arm 190 to engage portion 197 of member 180 and, likewise, will not allow deflector 169 to swing on its pivot. The ledge 181 is provided to prevent spring 195 from pulling arm 190 too far toward the front of the device.

Figure 10:
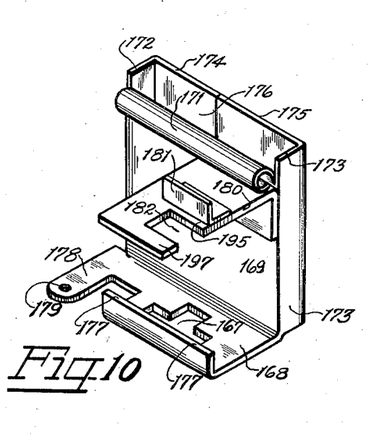
Figure 10 is a perspective view of the deflector for the checks.

As previously described, arm 164 projects thru T-shaped slot 167 and it is evident that in case the coin or check should be larger than the prescribed check for use with this device that the lower end of arm 164 would pass into the right hand portion of slot 167 as seen in Figure 10 and prevent the deflector from being swung and the coin would pass out of opening 200 in the lower part of the casing and strike against partition 201 and be ejected from opening 11 and be returned to the depositor, whereas, if the check were too small the arm 164 would move into the left hand side of slot 167, as seen in Figure 10, and also prevent the deflector from operating and the check or coin would be rejected in the same manner as if it were too large. If the check is of the prescribed diameter then the arm 164 will remain in the central portion of slot 167 and on account of the central portion being much deeper than the side portions of this slot 167, the deflector would be allowed to be swung and the check would be allowed to drop thru opening 202 and into the check controlled apparatus for operation of the same.

Connecting rod 17 is connected at its upper end to arm 203 by means of a pin 68 penetrating rod 17 and arm 203. Arm 203 has a downwardly projecting portion 204 forming the longer end of a bell crank lever in combination with arm 203. This bell crank lever, composed of portions 203 and 204 is pivotally mounted on a transverse pin 70 secured in sidewalls 33 and 34. Arm 204 has integral therewith a plate 207 which extends transversely across the device and has a hole 208 therein which is larger than the cylindrical portion 50 which passes thru this hole 208 so that in the swinging of arm 204, it will not strike against any portion of cylindrical member 50.

At the other side of plate 207, there is integral therewith another arm 209 which has an inwardly projecting portion 210 in which there is a hole thru which passes an arm 211, this arm 211 being resilient and is pivotally mounted on pin 70 at its upper end and is normally flexed to hold the deflector 169 in normal position as shown in the drawings.

Arm 211 is pivotally mounted on pin 70 and passes downwardly thru a hole in portion 210 of arm 209 (see Fig. 3) and also passes thru hole 179 of portion 178 of deflector 169. This arm 211 is made of spring wire and is therefore resilient and in normal position, tension is exerted on the lower end of arm 211 to move the lower portion thereof toward the front of the device to hold the deflector in normal position, but when the pull rod 17 is pulled downwardly and arm 209 moves to the rear of the device, this tension forwardly on the lower part of arm 211 is destroyed and a counter pressure is exerted on the arm 211 to cause the lower end thereof to press toward the rear of the device to swing the deflector 169 on its pivot 170 provided all obstructions as above described are removed from the path of the deflector.

Bell crank lever, composed of parts 203, 204, 207, and 209 is normally held in the position shown in the drawings by means of a torsion spring 212 which has one leg resting against transverse pin 213 and the other leg is hooked as at 214 beneath the lower edge of plate 207. Arm 204 has an inturned projection 215 which projects inwardly and upwardly behind tubular member 151, that is, between tubular member 151 and the front of the machine, and coin supports 152 and 153 are loosely secured in this tubular member 151, the purpose of this projection 215 being to pull the coin supports 152 and 153 out of the path of the coin after the coin is pressed against the facial configuration testing means to allow it to fall downwardly.

The arm 204 projects further downwardly from the point at which projection 215 occurs and has a cut-away portion 216 therein to allow it to have a greater throw before engaging pin 217 when the device is operated. Arm 204 also has on the lower end thereof a sloping cam surface 218 which is adapted to engage the lower end of spring 222, which is loosely mounted around pin 217. Torsion spring 222 has another leg 223, having a hook 224 hooked around the lower end of pivoted arm 140.

Figure 4:
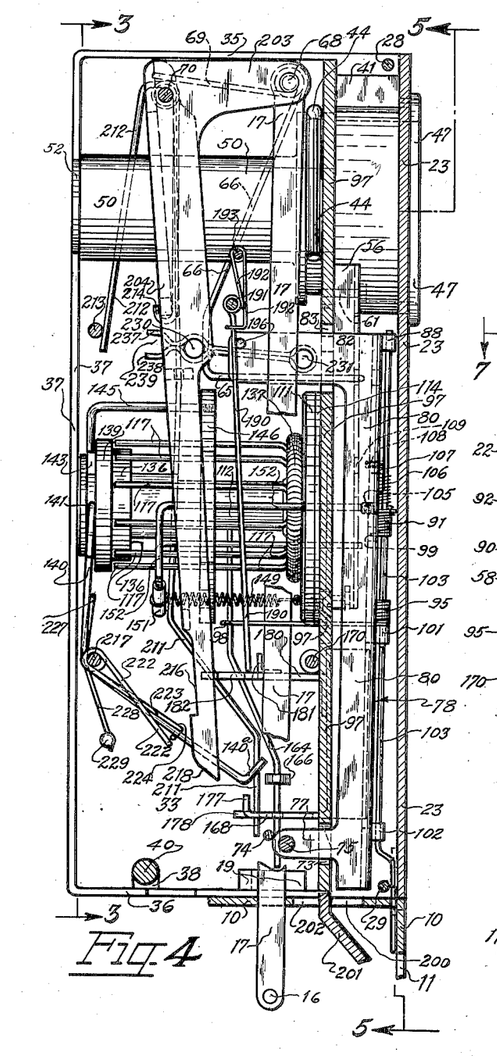
Figure 4 is a reverse view of Figure 2 and showing the side, back, top and bottom portions removed; and taken along the line 4—4 in Figure 3.

Pivoted arm 140 is adapted to normally be, at its upper end, pressed to the left in Figure 4 or to the right in Figure 2 by means of a torsion spring 226 (see Fig. 3) which has a leg 227 passing in front of the upper portion of arm 140, and has another leg 228 which is fastened to pin 229 on sidewall 33, the purpose of this latter spring 226 being to normally hold member 139 and associated parts, out of engagement with the ends of bell crank levers 117 to permit their free operation when acted upon by the facial configuration of the inserted check and when the cam surface 218 on lower end of arm 204 engages leg 222 of torsion spring 221 the spring 226 will be overcome by spring 221 and member 139 and associated parts (see Fig. 12) will be moved on tubular member 112 if all of the bell crank levers 117 are spread at their right hand end as seen in Figures 2 and 12 and this will fail to operate the deflector mechanism because the upturned portion 140a of member 140 will move down into the path of ledge 177 and prevent the deflector 169 from swinging, and the check will be rejected, whereas, if one or more of the bell cranks 117 are not spread outwardly from member 137 by the facial configuration of the check when pressure is brought to bear thereon, it will allow the deflector to be operated and to cast the check into the check controlled apparatus because port 140a will be held in the position shown in Figure 4 out of the path of the deflector 169.

Figure 18:
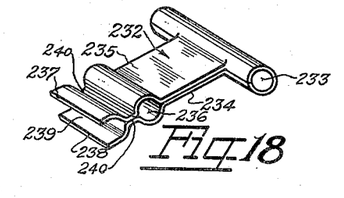
Figure 18 is a perspective view of portion 232.

Arms 204 and 209 have mounted therein and spanning the distance therebetween, a pin 230 and projections 81 and 82 have mounted therein and spanning the distance therebetween a pin 231 (see Figures 2, 3, and 4) on which is pivotally mounted a clamping member 232 (see Figure 18) which has the tubular portion 233 pivotally mounted on pin 231 and has the spring clamping arms 234 and 235 which have a circular transverse opening 236 therein and the upwardly and out-turned portions 237 and 238 forming a fork 239 between their outer ends. The spring leaf portions 234 and 235 have the restricted portions 240. When connecting rod 17 is pulled downwardly, arms 204 and 209 are moved to the right in Figure 2 and this pulls with it the member 78 until set screw 105 (see Fig. 5) engages the coin and presents it against the ends 118 of facial configuration reading bell crank levers 117 and at this point further appreciable movement of the coin and member 78 ceases and by further pull on rod 17 arms 204 and 209 move further to the right in Figure 2 until pin 230 has passed restriction 240 and the clamping action of members 234 and 235 causes member 78 to move toward the front end of the machine and the pin 230 occupies the forked end of member 232 and the coin is released to fall into the deflector 169 which has already been operated or has failed to operate. When downward pull is relieved on pull rod 17, the torsion spring 212 forces pin 230 back thru the restricted portion 240 of member 232 (see Fig. 18) into the position shown in Figure 2.

If the facial configuration of the check is uneven as is usual in coins, at least one of the bell crank levers 117 will not be actuated and will remain in the path of the flange 139 (see Fig. 12) and upturned portion 140a (see Figs. 2 and 4) will be held up out of the path of projection 177 of the deflector 169 and it will be, therefore, held out of the path of the swing of the deflector as shown in Figures 2 and 4. In this position the arms 204 and 209 will swing further to the right in Figure 2 and pin 230 will pass into forked portion 239 of member 232 (see Fig. 18) and will apply tension to arm 211 and swing the deflector on its pivot 170 to cause its lower end to coincide with rear openings 27b and 202 to cause the check to be deflected into the check controlled apparatus. Such deflection occurs before pull is released on rod 17. While the arms 204 and 209 are moving toward the rear of the machine and when the pin 230 passes the restriction 240 in member 234 the tension of members 234 and 235 causes the member 78 to move toward the front of the machine and release pressure of set screw 105 on the check and allows it to fall into the deflector while the deflector is in position to deflect into the check controlled apparatus as desired.

Attention might be called to the fact that, if all of bell crank levers 117 are spread apart, member 135 would be allowed to slide toward the front of the device on tubular member 112 and this would allow the lower end 140a of arm 140 to be in the path of ledge 177 of the lower portion of the deflector and this would prevent the deflector from operating.

It is evident that by adjusting screw 133, which is threadably secured in tubular position 125 that the ends 118 of bell crank levers 117 may project any desired distance from face 134 and by this adjustment the effectiveness of the facial configuration test may be regulated as it is evident that if ends 118 projected very far they would all be effected by a genuine check or coin having very marked differences in maximum and minimum relief, and in such a case all of the bell crank levers 117 would be moved out of the path of flange 136 and such coin or check would be rejected. It is thus seen that by the adjustment the device can be adjusted to any desired degree of effectiveness.

Although the method of operation of various portions of the mechanism have been described, at the point where the particular structure has been explained, a brief description of the method of operation for a genuine check might be advisable.

Figure 6:
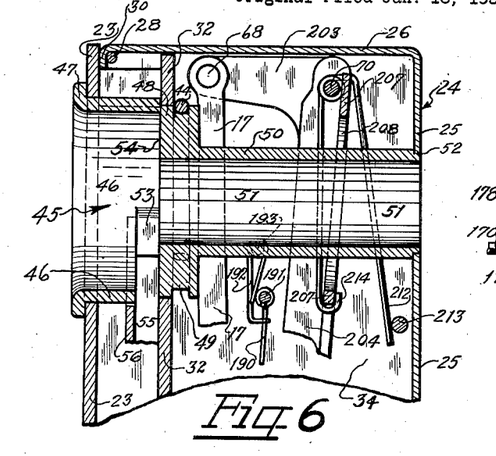
Figure 6 is a vertical sectional view taken along the line 6—6 in Figure 5.

A check or coin C is inserted into the opening O (see Fig. 6) against the bottom of the opening O, and when it is released by the finger of the operator the check falls downwardly thru slot 53 and into chute 55 formed by member 56 and falls against coin supporting pins 152 and 153 and also rests against portion 163 of the diameter determining means and if of the proper diameter, arm 164 will remain in the central portion of slot 167 (see Fig. 10) and this will remove one obstruction from the path of the deflector and permit it to operate if the check passes the other tests.

Hand pressure is applied to the rod 17 by manual or any other suitable means and member 78 is moved inwardly and set screw 105 engages the central portion of the check and the check is pressed against the ends 118 of the bell cranks 117 and if the check is of proper thickness, pin 196 (see Fig. 4) will move swinging arm 190 far enough to allow its lower end to coincide with the notch 182 in deflector 169 and, therefore, remove this obstruction from the path of swing of the deflector.

Due to the normal tendency of torsion spring 67, the downwardly projecting leg 66 which is integral with the coin holder 64, causes the coin holder 64 to be held snugly and resiliently against the second check C which may have been dropped into the device before the first check is expelled therefrom, and when the parts move back toward normal position pin 230 engages leg 66 of torsion spring and pushes the portion 64 away from any check which might be in the machine and back into opening 63 and also into opening 87 in member 78 out of the path of a falling check passing from the entrance to the facial configuration testing means or if a second check is held by 64 it permits it to drop on coin supports 152 and 153 and occupy a position in front of the facial configuration testing means 118. In this way, it is impossible to unduly affect the device by inserting two or more checks in succession before applying the testing operation to the first inserted check.

In the drawings and specification there has been set forth a preferred embodiment of my invention, and although specific terms are employed, they are used in a generic and descriptive sense only, and not for purposes of limitation, the scope of the invention being set forth in the appended claims.

I claim:

1. In a check testing apparatus, a plurality of feelers adapted to feel the facial configuration of a presented check, means for pressing the check against the feelers, means controlled independently by any one of the feelers for directing the check through the apparatus and single means for adjusting the degree of effectiveness of said feelers.

2. In a check testing apparatus, a plurality of feelers adapted to feel the facial configuration of a check, means for receiving the check if genuine, means independently controlled by each of the feelers for controlling the means for receiving the check if genuine and single means for adjusting the degree of effectiveness of said feelers.

3. In a check testing apparatus, a plurality of independently movable feelers for engaging the face of the check, movable means controlled independently by each of the feelers for deflecting the check in one of two directions after its face has been engaged by the feelers, and means preventing movement of the deflector when all of the feelers have been actuated a predetermined amount by said check, and means for adjusting the degree of effectiveness of said feelers.

4. In a check controlled apparatus, a plurality of means for testing the facial configuration of a check, means for testing the diameter of a check, means for testing the thickness of a check, means for testing for a perforation in a check, movable deflecting means for a check and means controlled by all of said testing means for controlling the movement of said deflecting means.

5. In a check controlled apparatus, a plurality of means for testing the facial configuration of a check, means for testing the diameter of a check, means for testing the thickness of a check, means for testing for a perforation in a check, movable deflecting means for a check, means controlled by all of said testing means for controlling the movement of said deflecting means, and means for adjusting the effectiveness of the configuration testing means.

6. In a check testing apparatus a plurality of independently movable bell crank levers having one of their ends adapted to feel the facial configuration of an inserted check, means for supporting the check in front of said ends of said bell cranks, means for applying pressure on the check to present it to said ends of said bell cranks, movable deflecting means and means controlled by said bell cranks for controlling the deflecting means, means for operating the deflecting means when pressure is applied to the check and at least one of the bell cranks is affected below a predetermined amount, and means for adjusting the degree of effectiveness of said bell cranks.

7. In a check controlled apparatus, a plurality of means for testing the facial configuration of a check, means for testing the diameter of a check, means for testing the thickness of a check, means for testing for a perforation in a check, movable deflecting means for a check, means for normally holding the deflecting means in one position, a plurality of means controlled by all of said testing means and normally acting to prevent movement of the deflecting means and being movable by a prescribed check to non-obstructing position with relation to the deflecting means.

8. In a check controlled apparatus, a plurality of means for testing the facial configuration of a check, means for testing the thickness of a check, means for testing the diameter of a check, means for testing for a perforation in a check, movable deflecting means for a check, means for normally holding the deflecting means in one position, a plurality of means controlled by said testing means and normally acting to prevent movement of the deflecting means and being movable by a prescribed check to non-obstructing position with relation to the deflecting means, and means for adjusting the effectiveness of the configuration testing means.

9. In a check testing apparatus a plurality of independently movable bell crank levers having their shorter ends adapted to feel the facial configuration of an inserted check, means for supporting the check in front of said ends of said bell cranks, means for applying pressure on the check to present it to said ends of said bell cranks, movable deflecting means, means controlled by said bell cranks for controlling the deflecting means, means for operating the deflecting means when pressure is applied to the check and at least one of the bell cranks is affected below a predetermined degree, and means for adjusting the degree of effectiveness of said bell crank levers.

10. In a check testing apparatus means for testing the check for perforations, means for testing the check for thickness, a deflector mechanism, means for swinging the deflector mechanism when free of obstructions, a member normally obstructing the path of the deflector, means controlled by the thickness testing means for moving said member, and means for rendering the perforating testing means inoperable to hold the said obstructing member in unobstructing position and immovable by the thickness testing means.

11. In a check testing apparatus, means for testing the diameter of a check, means for testing the check for perforations, means for testing the thickness of a check, deflecting means for deflecting the check in one of two directions depending on its genuineness, means controlled by the thickness testing means and diameter testing means and perforation testing means for controlling the operation of the deflecting means, and means for rendering the perforation testing means and thickness testing means inoperable at will.

12. In a check testing apparatus, means for testing the facial configuration of a check, means for testing the diameter of a check, means for testing the check for perforations, means for testing the thickness of a check, deflecting means for deflecting the check in one of two directions depending on its genuineness, means controlled by the thickness testing and diameter testing means, and perforation testing means and facial configuration testing means for controlling the operation of the deflecting means, means for rendering the perforation testing means, thickness testing means inoperable, and means for adjusting the degree of effectiveness of said facial configuration testing means.

13. In a check testing apparatus, a plurality of means for testing the facial configuration of a check, means for testing the diameter of a check, means for testing the thickness of a check, movable means for deflecting the check in one of a plurality of directions, means for normally holding the deflecting means in one position, means controlled independently by all of said testing means for controlling the movement of said deflecting means, and means for adjusting the degree of fineness of the facial configuration testing means.

14. A check testing apparatus having a plurality of means for testing the facial configuration of a presented check, means for testing the diameter of a presented check, means for testing the thickness of a presented check, means controlled independently by all of said means for disposing of said check as it leaves the check testing apparatus, and means for adjusting the degree of effectiveness of the facial configuration testing means.

15. In a check testing apparatus, means for testing the facial configuration of a check, means for pressing the check against said facial configuration testing means, means for testing the diameter of a check, means for testing the thickness of a check, means for testing for a perforation in a check, movable deflecting means for a check and means controlled by all said testing means for controlling the movement of said deflecting means.

16. In a check testing apparatus, means for testing the facial configuration of a check, means for pressing the check against said facial configuration testing means, means for testing the diameter of a check, means for testing the thickness of a check, means for testing for a perforation in a check, movable deflecting means for a check, means controlled by all said testing means for controlling the movement of said deflecting means, and other means for applying pressure to a perforated check when the means for pressing the check against said facial configuration testing means coincides with a perforation in a check.

17. In a check controlled apparatus, a plurality of means for testing the facial configuration of a check, means for testing the diameter of a check, means for testing the thickness of a check, means for testing for a perforation in a check, means for pressing the check against the means for testing the facial configuration, movable deflecting means for a check, means controlled by all of said testing means for controlling the movement of said deflecting means, and means for adjusting the effectiveness of the configuration testing means.

18. In a check controlled apparatus, a plurality of means for testing the facial configuration of a check, means for testing the diameter of a check, means for testing the thickness of a check, means for testing for a perforation in a check, movable deflecting means for a check, means for normally holding the deflecting means in one position, a plurality of means controlled by all of said testing means and normally acting to prevent movement of the deflecting means and being movable by a prescribed check to nonobstructing position with relation to the deflecting means, and means for adjusting the degree of effectiveness of said configuration testing means.

19. In a fraud preventive device for check controlled apparatus, a member having a plurality of independently movable bell crank levers therein and having their shorter leg projecting from the face of the member for engaging the face of a check pressed against said member, and means controlled independently by each of said bell crank levers for guiding said check thru said apparatus.

20. In a fraud preventive device for check controlled apparatus, a movable member, a plurality of independently movable bell crank levers mounted in said movable member and having their shorter leg projecting from the face of the movable member for engagement with the surface of a check pressed thereagainst and means controlled independently by each of said bell crank levers for disposing of said check.

21. A check testing apparatus having movable means for testing the diameter of a presented check, movable means for testing the thickness of a presented check and means controlled independently by both of said means for disposing of said check as it leaves the check testing apparatus.

22. In a check testing apparatus having a plurality of means for testing the surface configuration of a presented check, means for testing the diameter of a presented check, and means controlled independently by each of said means for disposing of said check as it leaves the check testing apparatus.

23. In a check testing apparatus, a plurality of independently movable feelers adapted to engage the side of a check pressed thereagainst, means controlled independently by any one of said feelers for directing the check thru the apparatus and single means for simultaneously adjusting the degree of effectiveness of all of said feelers.

24. In a check testing apparatus, resilient means for testing a check for a perforation, a movable deflector, an obstruction normally preventing movement of the deflector, means for moving the obstruction to allow movement of the deflector when the perforation testing means is engaged by the side of a check of prescribed thickness and means operable at will for holding the perforation testing means in inoperative position.

25. In a check testing apparatus, a movable deflector, said deflector having openings therein, means for moving the deflector, means for testing the check as to diameter, a depending member normally held in obstructing position with relation to said deflector to prevent movement thereof being controlled by the testing means to position the depending member to coincide with an opening in the deflector to allow movement of the deflector if the check is of prescribed diameter.

26. In a check testing apparatus a plurality of movable feelers, means for pressing the side of an inserted check against one end of said feelers to move the other end of the feelers in varying degrees according to the variation in evenness of the surface of the check, a movable member normally blocked against movement by said feelers, a deflector for guiding said check after it is subjected to the feelers, means for moving the deflector, means controlled by said movable member for normally blocking movement of the deflector, and means for moving the movable member past the ends of said feelers when they are moved by the inserted check so the deflector will be unblocked and will be moved by the means for moving the same to a position to direct the check as genuine into the apparatus.

AARON A. KNEE.